(12) United States Patent
Edeline

(10) Patent No.: US 9,156,428 B2
(45) Date of Patent: Oct. 13, 2015

(54) VEHICLE SAFETY DEVICE

(75) Inventor: Franck Edeline, LeVaumain (FR)

(73) Assignee: Faurecia Interieur Industrie, Nanterre (FR)

(*) Notice: Subject to any disclaimer, the term of this patent is extended or adjusted under 35 U.S.C. 154(b) by 0 days.

(21) Appl. No.: 14/342,038

(22) PCT Filed: Jul. 6, 2012

(86) PCT No.: PCT/FR2012/051599
§ 371 (c)(1),
(2), (4) Date: Feb. 28, 2014

(87) PCT Pub. No.: WO2013/030473
PCT Pub. Date: Mar. 7, 2013

(65) Prior Publication Data
US 2014/0203540 A1    Jul. 24, 2014

(30) Foreign Application Priority Data
Sep. 1, 2011  (FR) .................................. 11 57761

(51) Int. Cl.
*B60R 21/205* (2011.01)
*B60R 21/215* (2011.01)
*B60K 37/00* (2006.01)
*B60R 21/16* (2006.01)

(52) U.S. Cl.
CPC ............. *B60R 21/215* (2013.01); *B60K 37/00* (2013.01); *B60R 21/205* (2013.01); *B60R 2021/161* (2013.01); *B60R 2021/21537* (2013.01)

(58) Field of Classification Search
CPC ............. B60R 2021/21537; B60R 21/205; B60R 21/215; B60R 2021/161; B60K 37/00
USPC .............................................. 280/728.3, 732
See application file for complete search history.

(56) References Cited

U.S. PATENT DOCUMENTS

| | | | | |
|---|---|---|---|---|
| 5,035,444 | A | * | 7/1991 | Carter ........................... 280/732 |
| 5,427,408 | A | * | 6/1995 | Ando et al. ................ 280/728.3 |
| 5,429,385 | A | * | 7/1995 | Kamiji et al. .............. 280/728.3 |
| 5,452,913 | A | * | 9/1995 | Hansen et al. ............. 280/728.1 |
| 5,639,115 | A | * | 6/1997 | Kelley et al. ............... 280/728.3 |
| 5,901,976 | A | * | 5/1999 | Kreuzer et al. ............ 280/728.3 |
| 5,941,558 | A | * | 8/1999 | Labrie et al. ............... 280/728.3 |
| 6,158,763 | A | * | 12/2000 | Dominique et al. ....... 280/728.2 |

(Continued)

FOREIGN PATENT DOCUMENTS

| | | |
|---|---|---|
| DE | 10306385 A1 | 11/2004 |
| FR | 2921611 | 2/2007 |

OTHER PUBLICATIONS

International Search Report from related International Application No. PCT/FR2012/051599; report dated Sep. 20, 2012.

*Primary Examiner* — Laura Freedman
(74) *Attorney, Agent, or Firm* — Miller, Matthias & Hull LLP

(57) ABSTRACT

A safety device positioned between an interior trim element of a vehicle and an airbag, comprising:—a chute channel designed to accommodate the airbag, the chute channel delimiting an opening for deployment of the airbag;—a flap at least partially covering the opening when the airbag is in the uninflated state;—a hinge connection connecting the flap to the chute channel; and—a deflector connected to the chute channel and intended to be positioned facing the hinge connection, the chute channel, the flap, the hinge connection and the deflector are formed as one piece with one another.

13 Claims, 5 Drawing Sheets

(56) References Cited

U.S. PATENT DOCUMENTS

| | | |
|---|---|---|
| 6,378,894 B1 * | 4/2002 | Trevino et al. ............. 280/728.3 |
| 6,467,800 B1 * | 10/2002 | Bey et al. .................... 280/728.3 |
| 6,568,705 B2 * | 5/2003 | Kinane ....................... 280/728.3 |
| 7,140,636 B2 * | 11/2006 | DePue et al. ................. 280/732 |
| 7,160,404 B2 * | 1/2007 | Cowelchuk et al. ......... 156/73.1 |
| 7,178,825 B2 * | 2/2007 | Fujii et al. .................. 280/728.3 |
| 7,210,700 B2 * | 5/2007 | Zagrodnicki et al. ...... 280/728.3 |
| 7,669,884 B2 * | 3/2010 | Kikuchi et al. ............ 280/728.3 |
| 7,740,269 B2 * | 6/2010 | Kang ......................... 280/728.3 |
| 8,181,986 B2 * | 5/2012 | Schlemmer ................. 280/728.3 |
| 8,424,905 B2 * | 4/2013 | Brunet ....................... 280/728.3 |
| 8,590,923 B2 * | 11/2013 | An ............................ 280/728.3 |
| 2006/0033313 A1 * | 2/2006 | Horiyama ................... 280/728.3 |
| 2007/0040359 A1 | 2/2007 | Chen et al. |
| 2009/0134608 A1 | 5/2009 | Kang |

* cited by examiner

VEHICLE SAFETY DEVICE

CROSS-REFERENCE TO RELATED APPLICATIONS

This application is a 35 USC §371 U.S. national stage filing of International Patent Application No. PCT/FR2012/051599 filed on Jul. 6, 2012, and claims priority under the Paris Convention to French Patent Application No. FR 11 57761 filed on Sep. 1, 2011.

FIELD OF THE DISCLOSURE

The present invention relates to a safety device positioned between an interior trim element of a vehicle and an airbag, comprising:
- a chute channel suitable for receiving the airbag, the chute channel delimiting an opening for deployment of the airbag;
- a flap at least partially covering the opening when the airbag is in an uninflated state;
- a hinge connection connecting the flap to the chute channel; and
- a deflector connected to the chute channel and intended to be positioned facing the hinge connection.

BACKGROUND OF THE DISCLOSURE

Such a device is generally positioned under an interior trim element. The interior trim element has a window defined by a line of least resistance, and a peripheral region surrounding the window. In such an arrangement, the interior trim element covers the safety device to which the airbag is attached, with the window of the interior trim element facing the opening for deployment of the airbag delimited by the chute channel, and with the flap of the device being attached to the window of the trim element.

When the airbag is inflated, it first fills the volume defined by the inner walls of the chute channel and the flap to strike against the lower face of the flap, which causes the window to open along the line of least resistance. Next, the airbag passes through the window of the trim element and is deployed within the passenger compartment in order to protect the occupants.

Given the speed at which the flap opens, the extreme temperatures the safety device is subjected to, and the stresses applied by the airbag on the safety device, it has been noted that the hinge connection could partially or completely tear. If the hinge connection completely tears, the flap could be projected into the passenger compartment of the vehicle, towards the occupants of the vehicle.

To reduce this risk, a device is known, for example from document DE 103 06 385 A1, comprising a chute channel and a deflector connected to the chute channel, as well as a trim element in which a window is arranged, the window being connected to a peripheral region of the trim element by a hinge connection. During an impact to the vehicle, the airbag displaces the window to deploy within the passenger compartment of the vehicle. The hinge connection, protected by the deflector, allows the window to pivot relative to the chute channel while retaining the window, which prevents it from being projected into the passenger compartment where it could injure a passenger. With this type of device and arrangement, the hinge connection is incorporated into the trim element. The step in the device manufacturing process for incorporating the hinge connection into the trim element requires more complex tooling, which results in a less reliable and more expensive device. In addition, the incorporation of the hinge into the trim element can cause flaws on the upper part of the trim element, meaning flaws visible to the vehicle occupants, depending on whether the trim element is a piece covered with a thick covering layer or is a left bare piece, meaning uncovered or covered with a thin covering layer.

SUMMARY OF THE DISCLOSURE

The invention aims to provide a safety device that is simpler and less costly.

An object of the invention is therefore a safety device for a vehicle of the above type, wherein the chute channel, the flap, the hinge connection and the deflector are formed as one piece with one another.

This feature facilitates the manufacture of the device and its assembly into the vehicle, thereby reducing the corresponding production costs.

The device according to the invention may possibly further include one or more of the following features:
- the deflector is connected to the chute channel by a film hinge;
- the deflector is manufactured in an open position, where the deflector is away from the hinge connection, and is then folded over the chute channel into an operative position, where the deflector is arranged facing the hinge connection;
- it comprises a retention system adapted to retain the deflector in position facing the hinge connection;
- the retention system comprises a plurality of lugs arranged on at least one among the deflector and the hinge connection, each lug being adapted to cooperate with a corresponding aperture formed in at least the other among the deflector and the hinge connection;
- the retention system comprises a plurality of ribs arranged on at least one among the deflector and the flap, each rib being adapted to cooperate with a corresponding groove formed in at least the other among the deflector and the flap;
- the deflector has an angle bracket shape adapted for covering the hinge connection;
- the hinge connection comprises a hinge having a S-shape cross-section;
- the chute channel and the deflector comprise windows for attaching an airbag safety module, the attachment windows being respectively positioned in corresponding pairs, and
- it is made of elastomer.

Another object of the invention is a dashboard for a vehicle, comprising a dashboard body, wherein it comprises a device as described above, attached to an inner surface of the dashboard body.

Another object of the invention is a vehicle, wherein it comprises a dashboard as defined above.

BRIEF DESCRIPTION OF THE DRAWINGS

The invention will be better understood by reading the following description of an embodiment of the invention, given only by way of example and with reference to the accompanying drawings, in which.

DETAILED DESCRIPTION OF THE DISCLOSURE

In the following description, the terms used to define the position and orientation, such as "front" and "rear", are understood to be relative to the position of a driver and to the direction of travel of the vehicle. The term "longitudinal" is defined as the front-rear direction and the term "transverse" is defined as being width-wise relative to the vehicle, meaning in a direction substantially perpendicular to the front-rear direction in a horizontal plane.

Referring to the figures, it is described a safety device arranged between a vehicle interior trim element and an airbag. The vehicle interior trim element is, for example, as shown in a simplified manner in FIG. 1, a dashboard 10 of a vehicle 12. The vehicle interior trim element may, however, be any type of trim element such as a door panel or other element.

Figure 1:
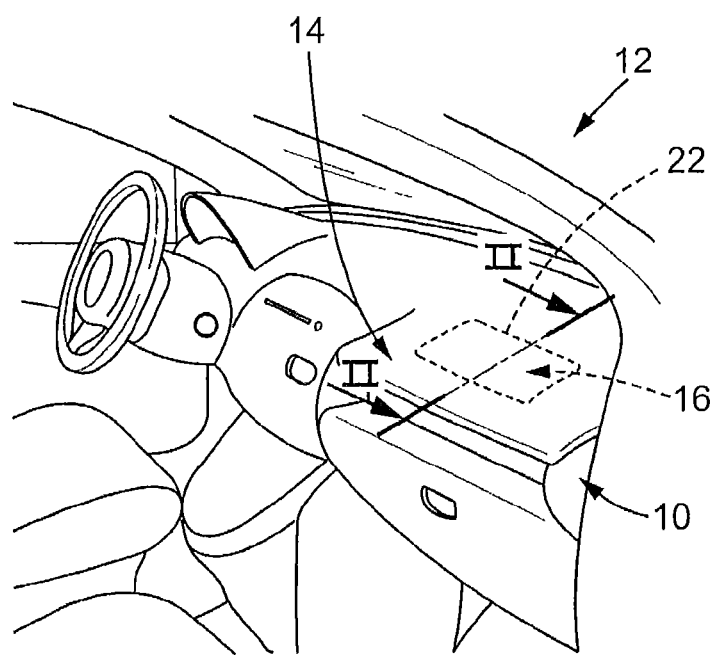
FIG. 1 is a schematic perspective view of the passenger compartment of a vehicle equipped with a safety device according to one embodiment of the invention.

The dashboard 10 comprises, among other things, a rigid support layer 14, often referred to as the "dashboard body" by a person skilled in the art, and an airbag safety device 16 housed under the dashboard body 14, on the passenger side (on the right in FIG. 1). The dashboard body 14 is manufactured by an injection type molding operation. The dashboard body 14 is molded using thermoplastic-type plastics, such as polypropylene PP, with or without fiber reinforcement or mineral filler depending on the stiffness desired. Alternatively, the material used may be PC/ABS (Polycarbonate/Acrylonitrile Butadiene Styrene).

Alternatively, the dashboard 10 further comprises a skin covering at least a portion of the dashboard body 14. This skin is made for example of PVC (polyvinyl chloride), TPO (thermoplastic polyolefin), TPU (thermoplastic polyurethane), or any other thermoplastic material which can provide a flexible skin. Alternatively, the dashboard body 14 may be covered with leather or a leather substitute.

Figure 2:
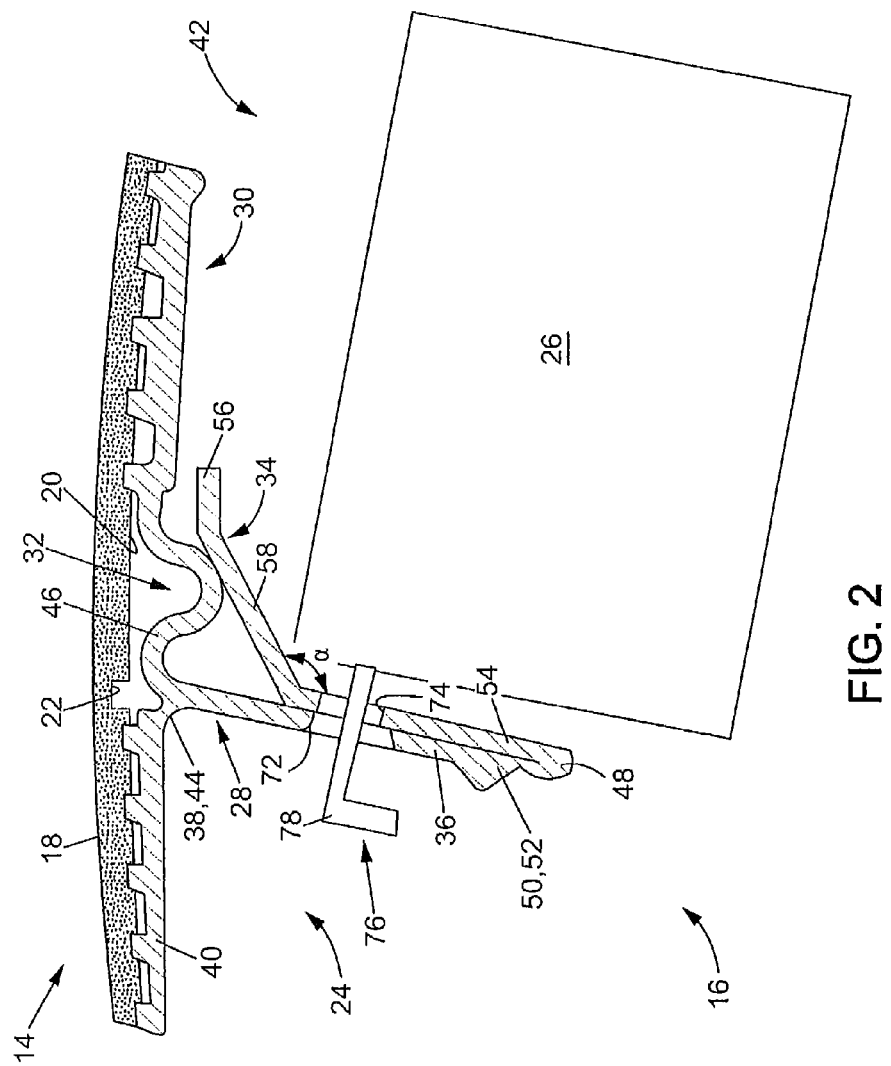
FIG. 2 is a longitudinal vertical cross-section along plane II of FIG. 1.

Referring to FIG. 2, the dashboard body 14 has an outer surface 18, visible to an occupant of the vehicle 12, and an inner surface 20.

The dashboard body 14 has a line of least resistance 22, formed by a score made on the inner surface 20, so it is not visible from the outside of the dashboard 10, and facing the safety device 16.

The line of least resistance 22 is obtained in a conventional manner, for example removing material by milling or by laser beam.

In the example described here, the line of least resistance 22 is a closed continuous line which in a plan view (FIG. 1) has a substantially rectangular shape. Alternatively, this closed continuous line may have a substantially trapezoidal shape.

In a variant, the line of least resistance 22 may be a continuous open line which in a plan view is substantially U-shaped with the open side towards the front of the vehicle 12.

In another variant, the line of least resistance 22 may appear, in a plan view, substantially I-shaped or H-shaped.

The safety device 16 comprises a support frame 24 attached to the dashboard body 14.

An airbag safety module 26 is fixed to the support frame 24.

Conventionally, the safety module 26 comprises a housing in which an airbag is arranged in an initial folded position as well as an airbag inflation apparatus, such as a gas or pyrotechnic device, triggered when the vehicle 12 experiences an impact.

The support frame 24 comprises a chute channel 28, a flap 30 hinged to the chute channel 28 by a hinge connection 32, and a deflector 34 connected to the chute channel 28.

The chute channel 28 is adapted to receive the safety module 26 and guide the airbag during its deployment.

Figure 3:
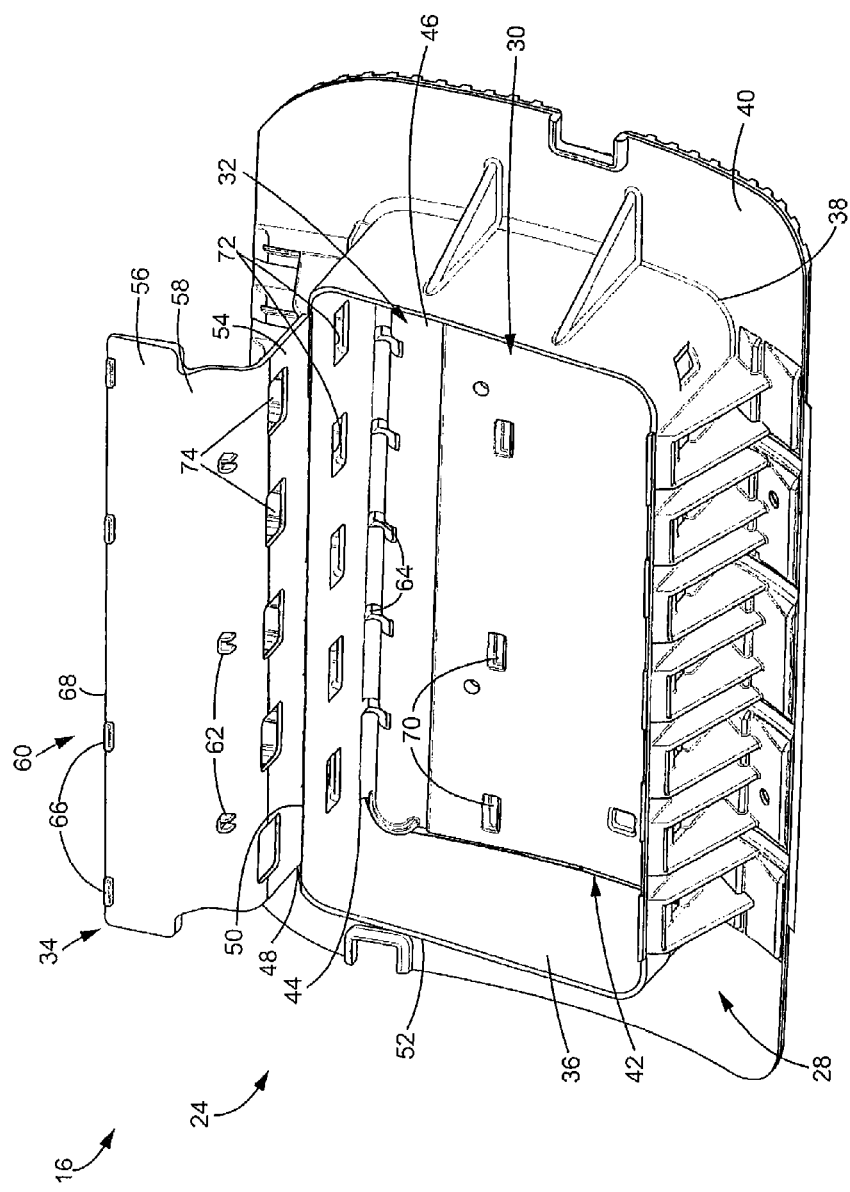
FIG. 3 is a bottom perspective view of the safety device of FIGS. 1 and 2 in an initial state of assembly on the vehicle.

As can best be seen in FIG. 3, in which the safety module 26 has been omitted for clarity, the chute channel 28 has, for example, a substantially rectangular cross-section defined by a closed side wall 36 further extended at its upper end 38, substantially radially, by a peripheral flange 40. Alternatively, the chute channel 28 has a substantially trapezoidal cross-section.

The peripheral flange 40 is attached to the inner surface 20 of the dashboard body 14, in particular by means of vibration welding, infrared welding, or other technique.

The upper end 38 of the side wall 36 is arranged substantially facing the line of least resistance 22 and thus delimits a central opening 42 for deployment of the airbag. Alternatively, the line of least resistance 22 is offset towards the outside of the chute channel 28 relative to the upper end 38.

The central opening 42 has a substantially rectangular shape corresponding to the shape of the cross-section of the chute channel 28. Alternatively, the central opening 42 has a substantially trapezoidal shape.

The flap 30 has a substantially rectangular shape corresponding to the shape of the central opening 42 so as to cover the central opening 42 when the airbag is in the non-inflated state. Alternatively, the flap 30 has a substantially trapezoidal shape.

The flap 30 is secured to the inner surface 20 of the dashboard body 14, in particular by means of vibration welding, infrared welding, or other technique.

The flap 30 is connected to the front portion 44 of the upper end 38 of the chute channel 28 by the hinge connection 32.

The flap 30 is thus hinged relative to the chute channel 28 substantially about a transverse axis.

The hinge connection 32 extends along the front portion 44 of the upper end 38 of the chute channel 28 so that the flap 30 swings forward upon deployment of the airbag and the flap 30 is retained on the chute channel 28 to avoid injuring a passenger.

In the example described here, the hinge connection 32 is formed by a hinge 46 having a substantially constant cross-section and a thickness close to that of the flap 30 and/or of the chute channel 28, and is integral with the chute channel 28 and the flap 30.

The hinge 46 has a substantially S-shape cross-section such that, upon deployment of the airbag, the flap 30 swings forward about a transverse axis which is not fixed, therefore with more freedom in comparison with a rotation about a fixed axis.

The deflector 34 is connected to the chute channel 28 by a film hinge 48 formed as one piece with the chute channel 28 and the deflector 34.

The film hinge 48 extends along the front portion 50 of the lower end 52 of the side wall 36 of the chute channel 28.

The deflector 34 is substantially in the form of an angle bracket and extends along the front portion 50.

The deflector 34 comprises a first wall 54 and a second wall 56, both substantially planar and extending substantially perpendicularly to each other, the first wall 54 being connected to the film hinge 48.

The deflector 34 comprises an intermediate wall 58 connecting the first and second walls 54, 56 to each other, the intermediate wall 58 being angled with respect to the first and second walls 54, 56.

The intermediate wall 58 is inclined at an angle a relative to the first wall 54, a advantageously being between 100° and 170°, preferably substantially equal to 135°.

The chute channel 28, the flap 30, the hinge connection 32, and the deflector 34 are formed as one piece with one another.

In other words, the support frame 24 is made as one piece.

The support frame 24 is manufactured from a plastic material, in particular an elastomer plastic, natural such as rubber for example, or synthetic such as a thermoplastic elastomer TPE type, for example EPDM, and obtained for example by injection molding which then requires only one injection step. The support frame 24 is manufactured so that the deflector 34 is initially in an open position (FIG. 3) where the deflector 34 extends substantially as an extension of the chute channel 28, from the film hinge 48.

The deflector 34, formed as one piece with the rest of the support frame 24, is therefore also of elastomer. Although this is unusual material for manufacturing the deflector 34, it is advantageous to do so because the risks of deflector breakage are reduced both during manufacture and during inflation of the airbag.

In the open position, the deflector 34 is thus away from the hinge connection 32.

Figure 4:
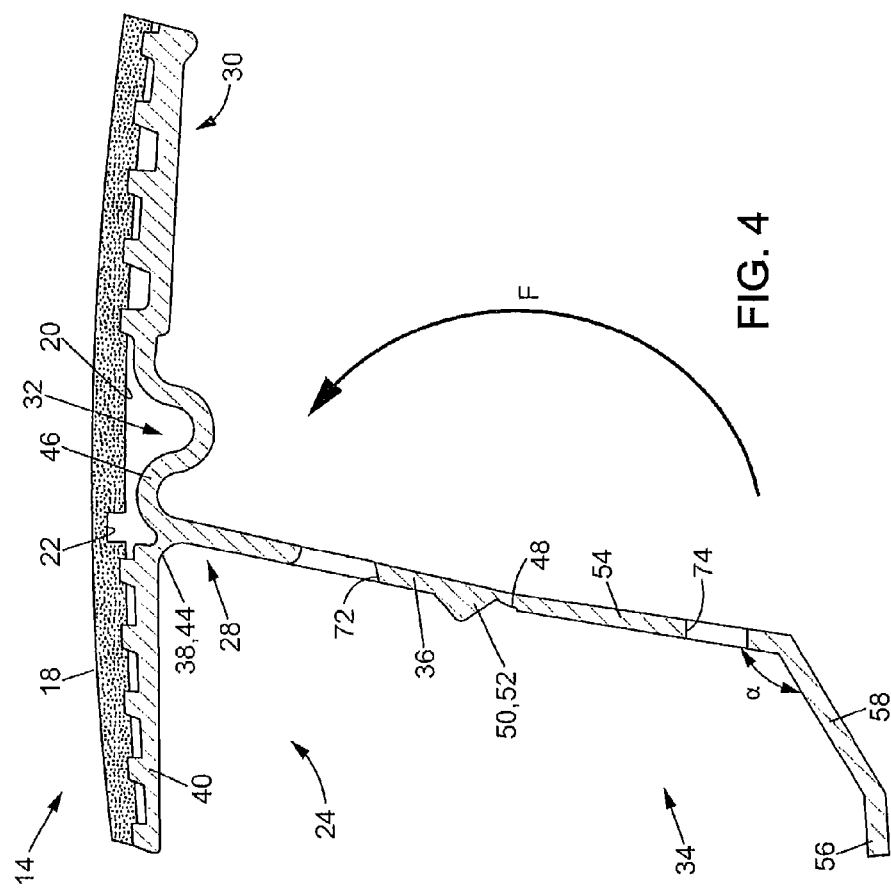
FIG. 4 is a view similar to the view of FIG. 2, illustrating the safety device in a first intermediate state of assembly on the vehicle.
Figure 5:
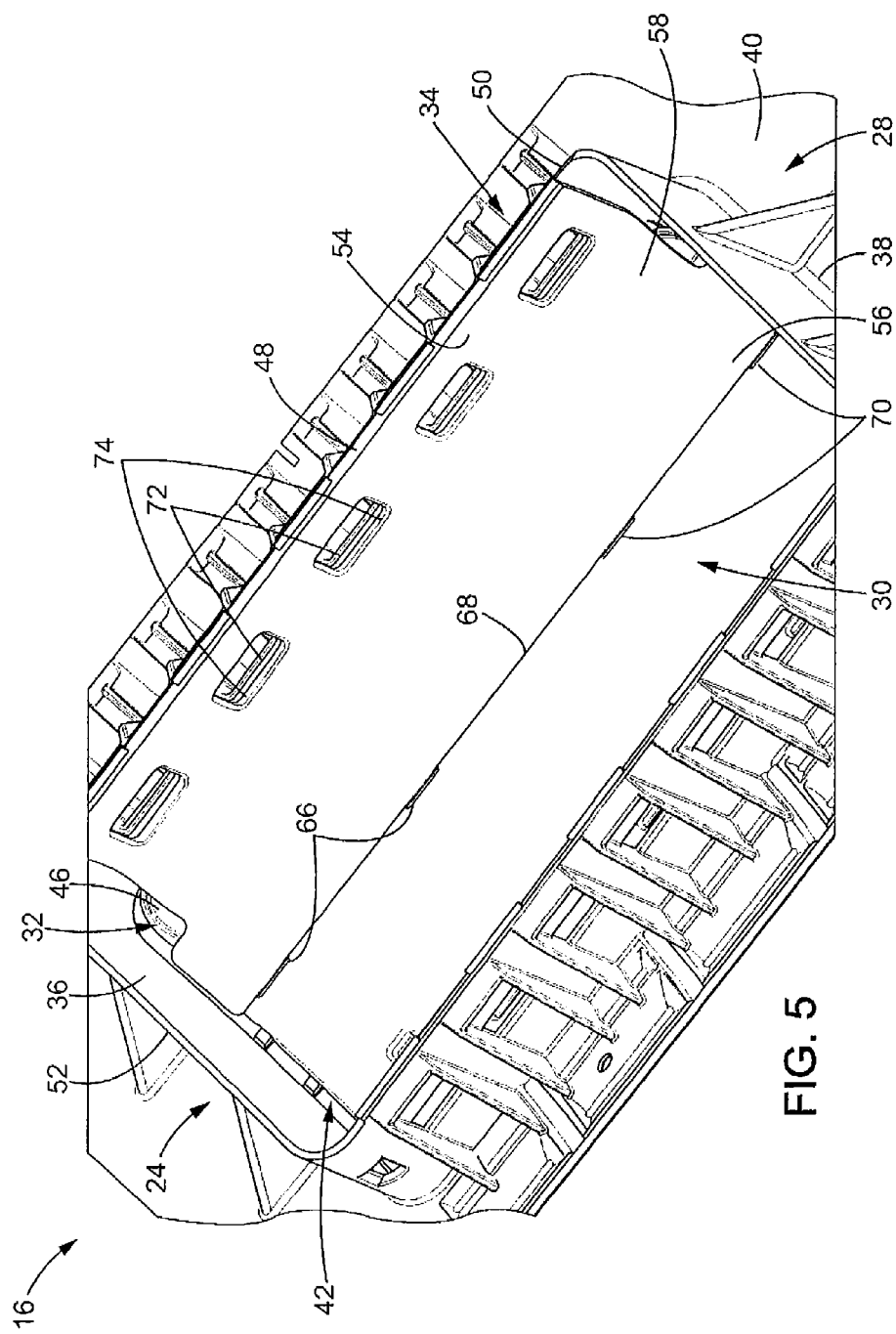
FIG. 5 is a view similar to the view of FIG. 3, illustrating the safety device in a second intermediate state of assembly on the vehicle.

The deflector 34 is then folded around the film hinge 48, as indicated by the arrow F in FIG. 4, to an operative position where the deflector 34 is facing the hinge connection 32 (FIGS. 2 and 5).

In the operative position, the first wall 54 of the deflector 34 thus covers the front side of the side wall 36 of the chute channel 28, the intermediate wall 58 of the deflector 34 covers the hinge connection 32, and the second wall 56 of the deflector 34 covers a front portion of the flap 30. Thus, the first wall 54 of the deflector 34 advantageously reinforces the side wall 36 of the chute channel 28 by doubling the thickness. In this position, the deflector 34 protects the hinge 32 from the airbag during airbag deployment. Furthermore, in this position, the deflector 34 advantageously protects the hinge 32 from the welding tool during the welding operation.

The deflector 34 is molded in the open position with the rest of the support frame 24, then is attached in its operative position.

The safety device 16 comprises a retention system 60 adapted for retaining the deflector 34 in the operative position.

The retention system 60 comprises a plurality of lugs 62 formed as one piece with the deflector 34 and projecting from the intermediate wall 58.

Each lug 62 is adapted to cooperate with a corresponding aperture 64 formed in the hinge connection 32.

Thus, in the operative position of the deflector 34, the lugs 62 are received in the respective apertures 64, in particular by snapping them into place, in order to retain the deflector 34 in the operative position.

The lugs 62/apertures 64 also serve to position the deflector 34 correctly relative to the hinge connection 32, especially when the deflector 34 is moved from its open position to its operative position.

The apertures 64 of the hinge connection 32 reduce the weight of the material and, when only a portion of the hinge connection 32 tears, enable to limit tear propagation to the entire hinge connection 32. Such tearing could occur due to very fast pivoting of the flap 30 during sudden airbag deployment.

This reduction in the weight of the material can also limit the stresses applied to the hinge connection 32 when the flap 30 pivots.

In a variant, the lugs 62 may be provided on the hinge connection 32 and the apertures 64 may be provided on the deflector 34.

In another variant, the lugs 62 and the apertures 64 may be provided on the hinge connection 32 and on the deflector 34 in an alternating manner.

The retention system 60 also includes a plurality of ribs 66 formed as one piece with the deflector 34 and projecting from the free edge 68 of the second wall 56.

Each rib 66 is adapted to cooperate with a corresponding groove 70 formed in the flap 30.

Thus, in the operative position of the deflector 34, the ribs 66 are received in the respective grooves 70, in particular by snapping them into place, in order to retain the deflector 34 in the operative position.

The ribs 66/grooves 70 also serve to position the deflector 34 correctly relative to the flap 30.

In a variant, the ribs 66 may be provided on the flap 30 and the grooves 70 may be provided on the deflector 34.

In another variant, the ribs 66 and the grooves 70 may be provided on the flap 30 and on the deflector 34 in an alternating manner.

Thus, in the operative position of the deflector 34, the first wall 54 of the deflector 34 is attached to the side wall 36 of the chute channel 28 by the lugs 62 and the apertures 64, and the second wall 56 of the deflector 34 is attached to the flap 30 by the ribs 66 and the grooves 70. The angle a of the intermediate wall 58 relative to the first wall 54, associated with the arrangement of the first and second walls 54, 56 of the deflector 34 on the chute channel 28 advantageously allows providing the deflector 34 with the necessary resistance to protect the hinge 32 and deflect the airbag during its inflation, even if the deflector 34 is made of elastomer plastic.

A plurality of windows 72, 74 are formed respectively in the front side of the side wall 36 of the chute channel 28 and in the first wall 54 of the deflector 34, in corresponding pairs, so as to receive fasteners 76 for the safety module 26, for example fastening hooks 78 (FIG. 2).

The support frame 24 can be attached to the inner surface 20 of the dashboard body 14 before or after the deflector 34 is folded into the operative position.

The operation of the safety device 16 is explained below.

When the vehicle 12 experiences an impact, the airbag of the safety module 26 is deployed.

The flap 30 of the safety device 16 is then pivoted by the thrust from the airbag, and the line of least resistance 22 of the dashboard body 14 yields so that the flap 30 opens and rotates about the hinge connection 32, clearing the opening 42 and allowing the airbag to deploy into the passenger compartment of the vehicle 12.

Simultaneously, the lugs 62/apertures 64 and the ribs 66/grooves 70 respectively disengage from each other, thereby disconnecting the deflector 34 from the flap 30 and from the hinge connection 32.

Under the thrust of the airbag, the second wall 56 and the intermediate wall 58 of the deflector 34 also swing forward, the first wall 54 being retained on the chute channel 28 by the film hinge 48 and the intermediate wall 58 remaining opposite the hinge connection 32.

The deflector 34 thus protects the hinge connection 32 from a violent collision with the airbag, thus limiting the mechanical stresses on the hinge connection 32 and therefore reducing the risk of the hinge connection 32 breaking and the flap 30 projecting into the passenger compartment.

Besides, the slope of the intermediate wall 58 of the deflector 34 towards the flap 30 and towards the center of the opening 42 deflects the airbag during its deployment towards the rear side of the support frame 24, meaning toward the side opposite the hinge connection 32. This contributes to limit the risk of the hinge connection 32 breaking and the flap 30 projecting. This also facilitates the pivoting of the flap 30 about the hinge connection 32.

The invention therefore provides an airbag safety device for a vehicle, which facilitates not only the manufacture of the device but also the assembly of the device in the vehicle, due to the support frame being integrally molded as one piece, thereby reducing the related production costs.

In addition, the specific shape of the hinge connection and of the deflector reinforces the chute channel and allows optimal pivoting of the flap upon airbag deployment while ensuring good retention of the flap.

The invention has been described with reference to a vehicle dashboard, but it is quite possible to apply the device of the invention to any suitable vehicle equipment, for example a door panel or a seat.

The invention claimed is:

1. A safety device positioned between an interior trim element of a vehicle and an airbag, comprising:
    a chute channel suitable for receiving the airbag, the chute channel delimiting an opening for deployment of the airbag;
    a flap at least partially covering the opening when the airbag is in an uninflated state;
    a hinge connection connecting the flap to the chute channel; and
    a deflector connected to the chute channel and intended to be positioned facing the hinge connection,
    wherein the chute channel, the flap, the hinge connection and the deflector are formed as one piece with one another,
    wherein, in an operative position, the deflector covers the hinge connection and wherein the deflector is connected to the chute channel by a film hinge.

2. The device according to claim 1, wherein the deflector is manufactured in an open position, where the deflector is away from the hinge connection, and is then folded over the chute channel into the operative position, where the deflector is arranged facing the hinge connection.

3. The device according to claim 1, wherein the device comprises a retention system adapted to retain the deflector in position facing the hinge connection.

4. The device according to claim 3, wherein the retention system comprises a plurality of lugs arranged on at least one among the deflector and the hinge connection, each lug being adapted to cooperate with a corresponding aperture formed in at least the other among the deflector and the hinge connection.

5. The device according to claim 3, wherein the retention system comprises a plurality of ribs arranged on at least one among the deflector and the flap, each rib being adapted to cooperate with a corresponding groove formed in at least the other among the deflector and the flap.

6. The device according to claim 1, wherein the deflector has an angle bracket shape adapted for covering the hinge connection.

7. The device according to claim 1, wherein the hinge connection comprises a hinge having an S-shape cross-section.

8. The device according to claims 1, wherein the chute channel and the deflector comprise windows for attaching an airbag safety module, the attachment windows being respectively positioned in corresponding pairs.

9. The device according to claims 1, wherein the device is made of elastomer.

10. A dashboard for a vehicle, comprising a dashboard body, wherein the dashboard comprises a device according to claim 1, attached to an inner surface of the dashboard body.

11. A vehicle, wherein the vehicle comprises a dashboard according to claim 10.

12. A safety device positioned between an interior trim element of a vehicle and an airbag, comprising:
    a chute channel suitable for receiving the airbag, the chute channel delimiting an opening for deployment of the airbag;
    a flap at least partially covering the opening when the airbag is in an uninflated State;
    a hinge connection connecting the flap to the chute channel; and
    a deflector connected to the chute channel and intended to be positioned facing the hinge connection,
    wherein the chute channel, the flap, the hinge connection and the deflector are formed as one piece with one another,
    wherein, in an operative position, the deflector covers the hinge connection,
    and wherein the deflector is manufactured in an open position, where the deflector is away from the hinge connection, and is then folded over the chute channel into the operative position, where the deflector is arranged facing the hinge connection.

13. A safety device positioned between an interior trim element of a vehicle and an airbag, comprising:
    a chute channel suitable for receiving the airbag, the chute channel delimiting an opening for deployment of the airbag;
    a flap at least partially covering the opening when the airbag is in an uninflated State;
    a hinge connection connecting the flap to the chute channel; and
    a deflector connected to the chute channel and intended to be positioned facing the hinge connection,
    wherein the chute channel, the flap, the hinge connection and the deflector are formed as one piece with one another,
    wherein, in an operative position, the deflector covers the hinge connection,
    and wherein a retention system comprises a plurality of ribs arranged on at least one among the deflector and the flap, each rib being adapted to cooperate with a corresponding groove formed in at least the other among the deflector and the flap.

* * * * *